United States Patent Office 3,264,214
Patented August 2, 1966

3,264,214
DRILLING FLUID
Charles A. Stratton, Bartlesville, Okla., assignor to Phillips Petroleum Company, a corporation of Delaware
No Drawing. Filed Oct. 19, 1962, Ser. No. 231,846
8 Claims. (Cl. 252—8.5)

This invention relates to drilling fluids. In another aspect, it relates to drilling fluids, such as the aqueous, oil-base, and emulsion types, used in drilling oil and gas wells, and other deep wells, said drilling fluids containing an anti-foaming agent. In a further aspect, this invention relates to a method of drilling wells with a drilling fluid containing an anti-foaming agent.

In the art of drilling wells to tap subterranean deposits, such as gas or oil, especially when drilling by the rotary method or the percussion method wherein cuttings must be removed from the bore hole, it is necessary to use a drilling fluid, as is well known to those skilled in the art. The especially prepared drilling fluid is pumped down a hollow drill string or stem within the bore hole, across the drill bit which is attached to the lower end of the drill stem, and is then normally circulated upwardly through the annular space between the drill stem and the bore hole. Circulation of the drilling fluid in this manner removes the cuttings from the bore hole, lubricates and cools the drill bit, seals the wall of the bore hole with a thin, impervious layer of solid material or filter cake, and applies a hydrostatic head to the formation to counterbalance formation pressures.

A highly effective drilling fluid can be prepared using water and oil-dispersible ammonium or alkali metal salts of sulfonated asphalts. These materials are conveniently prepared by sulfonating asphalts with a sulfonating agent, such as fuming sulfuric acid or the like, neutralizing the resulting sulfonic acids, and converting the same to the aforementioned water and oil-dispersible ammonium or alkali metal salts of sulfonated asphalts.

The term "asphalt" as herein employed is intended to cover dark brown to black semi-solid or solid cementitious hydrocarbon material which is completely or substantially soluble in carbon disulfide, in which material bitumens are the sole or predominant constituent, these materials occurring in nature as such or being obtained by refining petroleum by distillation, precipitation, cracking oxidation, or similar operations. The term "sulfonated asphalt" as herein employed is intended to cover an ammonium or alkali metal sulfonated asphalt that has been sulfonated with a sulfonation agent, such as oleum. Asphaltic materials that can be employed in preparing the aforementioned asphalt sulfonates include asphaltenes, maltenes, blown asphalt, straight residual oils, distillation residues, still bottoms, cracking residues, asphaltic bitumens, and the like. Reference is made to U.S. Patent 3,028,333 for a more complete description of the above drilling fluids and the method of preparing said drilling fluids.

The term "drilling fluid" as hereinafter employed refers to drilling fluids prepared by the process of U.S. Patent 3,028,333 and to drilling fluids containing hydroxylated asphalts described in U.S. Patent 3,006,846. These hydroxylated asphalts can be prepared, for example, by the fusion of the aforementioned sulfonated asphalts with alkali or caustic, such as sodium hydroxide and potassium hydroxide. A more complete description of the hydroxylated asphalt drilling fluids can be obtained by reference to U.S. Patent 3,006,846.

It has been observed that foaming occurs when a drilling fluid prepared as previously described is employed in several geographical locations. It has been observed, for example, that certain field muds found in drilling wells inland from the gulf coast are particularly susceptible to foaming in the circulation of the above drilling fluids. Foaming is due to inclusion of air or other gaseous bubbles in the circulating drilling fluid. Foaming of the drilling fluid substantially reduces the effectiveness of the drilling fluid. With foaming the viscosity of the drilling fluids is increased and the drilling fluid becomes non-uniform in composition. As a result, the drilling fluid becomes difficult to circulate due to a tendency of the circulating pumps to gas off.

I have discovered that metal petroleum sulfonates prepared from high viscosity oils are effective defoaming agents for the above drilling fluids.

Accordingly, an object of my invention is to provide an improved drilling fluid.

Another object of my invention is to provide a drilling fluid containing an anti-foaming agent.

Another object of my invention is to provide an improved method of drilling oil and gas wells, or other deep wells, using an improved drilling fluid.

Other objects, advantages, and features of my invention will be readily apparent to those skilled in the art from the following description and the appended claims.

The anti-foaming, or defoaming, agent of my invention is prepared by the sulfonation of a refined petroleum oil fraction having a viscosity in the range of 140–700 SUS at 210° F., preferably 200–230 SUS at 210° F. The refined oil can be prepared from a crude oil by a series of process steps such as thermal fractionation, vacuum distillation, propane fractionation, solvent extraction and dewaxing.

The refined oil can be sulfonated by contacting said oil with fuming sulfuric acid or with sulfur trioxide dissolved in sulfur dioxide or ethylene chloride at a contact temperature in the range at 58–200° F. A contact time in the range of 5–90 minutes is generally preferred. The acid to oil weight ratio is commonly in the range of 0.1:1.0 to about 1.0:1.0 when 20 weight percent fuming sulfuric acid is employed. When sulfur troxide or sulfur dioxide is the sulfonating agent, the sulfur trioxide to oil weight ratio is maintained equivalent to that available from the sulfuric acid.

Sulfur dioxide and ethylene chloride, when present, in the contact zone effluent is separated by conventional methods from the contact zone effluent and the remainder of the contact zone effluent passed to a neutralization step. When, for example, the alkaline earth metal derivatives of the petroleum sulfonic acids are desired, neutralization is commonly effected by use of the oxides, hydroxides, carbonates, and bicarbonates. For example, lime (CaO), calcium hydroxide, calcium carbonate, barium carbonate, and strontium carbonate can be employed as neutralizing agents. It is within the scope of this invention to employ other metallic salts in the preparation of the metal petroleum sulfonate such as the salts of lead, nickel, sodium and potassium. The amount of neutralizing agent employed is sufficient to neutralize the sulfonation zone effluent.

The neutralized mixture can be held at an elevated temperature for a period of time in order to insure completion of the neutralization reaction. Water and inorganic solids formed during the neutralization step are separated from the neutralized mixture by conventional separation process steps producing a hydrocarbon oil containing the product oil soluble metal petroleum sulfonate.

I have discovered that the most advantageous method of utilizing the metal petroleum sulfonate of a high viscosity oil is to blend (mix) the metal petroleum sulfonate with a dry ammonium or alkali metal salt of a sulfonated asphalt or hydroxylated asphalt. However, other methods of blending can be employed. For example, it may be more advantageous to mix a light hydrocarbon solution of the metal petroleum sulfonate with a light hydrocarbon suspension of the ammonium or alkali metal salt of a sulfonated asphalt and to dry the mixture on a drum drier.

It is also within the scope of this invention to introduce the metal petroleum sulfonate of a high viscosity oil directly into the circulating drilling fluid in situ, said drilling fluid containing an ammonium or alkali metal salt of a sulfonated asphalt or a hydroxylated asphalt.

The concentration of the metal petroleum sulfonate in the blend of the metal petroleum sulfonate and an ammonium or alkali metal salt of a sulfonated asphalt or hydroxylated asphalt is in the range of 1–30 weight percent of the blend of the two constituents and preferably in the range of 5–15 weight percent of the blend.

In the drilling fluids, the hydroxylated or sulfonated asphalts are dispersed in either the aqueous or the oil phase (fluid medium). The drilling fluids of this invention can be prepared by any conventional methods. The amounts of hydroxylated or sulfonated asphalt, water, and oil employed are dependent upon several variables, such as the nature of the sulfonated or hydroxylated asphalt itself, the density of the drilling fluid desired, the nature of the formation penetrated, and other factors that can be readily determined by those skilled in the art. It has long been customary in rotary well drilling operations to subject the drilling fluid to simple routine tests from time to time, and these tests are sufficient to indicate the relative amounts of hydrozylated or sulfonated asphalt, water, or oil to be employed. Generally, the amount of sulfonated asphalt employed, for example, will be sufficient to form a relatively thin, impervious filter cake on the wall of the well, and an amount that will impart a sufficiently low viscosity to the drilling mud in order that it may readily be pumped and circulated. In general, the amount of sulfonated asphalt added to the drilling fluid will be in the range from about 0.1 to about 10 pounds per barrel (42 U.S. gallons) of drilling fluid.

For water-in-oil emulsion systems, the amount of water to be employed will generally range from as low as 1 percent by weight of the final drilling fluid to 60 percent by weight, and preferably less than 40 percent by weight. For oil-in-water emulsion systems, the amount of water will be in the range from about between 99 to 60 percent by weight of the final emulsion and the amount of oil will be in the range from 1 to 40 percent by weight of the final emulsion.

The oil component used in preparing the oil-base and emulsion drilling fluids of this invention can be any hydrocarbon normally used for this purpose in the art, such as diesel fuel, crude oil, kerosene, gas oil, heavy fuel oil, various petroelum fractions, and the like.

As previously noted, the concentration of the metal petroleum sulfonate employed as an anti-foaming agent will range from about 1 to about 30 percent by weight of the total metal petroleum sulfonate and the hydroxylated or sulfonated asphalt present in the drilling fluid.

Although the drilling fluids of this invention need only contain the water-dispersible and oil-dispersible sulfonated or hydroxylated asphalt and the metal petroleum sulfonate as the materials necessary to obtain desirable rheological properties, especially low fluid loss, it is within the scope of this invention to add clays or other finely divided inorganic solids. In addition, materials commonly employed for weighting purposes can be added, including finely divided limestone, barite, lead sulfide, oyster shell, or the like. For emulsion systems any suitable conventional emulsifying agent, such as the alkaline earth metal salts of saponifiable oils such as vegetable oils, wood oils, fish oils and the like, can be employed. Other applicable emulsifying agents include "dresinates," alkali and alkaline earth metal salts of lignin, alkali metal salts of carboxymethyl cellulose, and the like. In general, the emulsion drilling fluids prepared according to this invention are relatively stable type emulsions.

The following example is illustrative of this invention and is not to be construed as unduly limiting the invention.

*Example*

A calcium petroleum sufonate having the following characteristics:

| | |
|---|---|
| Base number | 7.4 |
| Ash, wt. percent | 5.0 |
| Solids, wt. percent | 0.02 |
| Water, wt. percent | nil |
| Flash, pm., °F. | 455 |
| Viscosity, SUS @ 210° F. | 2223 |
| Sulfonate content | .501 | was mixed with a sodium sulfonated asphalt (Soltex) manufactured by Atoll Manufacturing Company. Four blends of the sodium sulfonated asphalt and calcium petroleum sulfonate were made with a weight percent concentration of calcium petroleum sulfonate as shown in Table I. The blended mixture was ground on an osterizer.

Mud from a Canadian County, Oklahoma, well and having the following characteristics:

| | |
|---|---|
| Specific gravity, lbs./gal. | 10.2 |
| Sand, wt. percent | 2.0 |
| NaCl, p.p.m. | 8500 |
| $CaCO_3$, p.p.m. | 1150 |
| Viscosity, apparent, centipoise | 8 |
| Viscosity, plastic, centipoise | 4 |
| Yield point | 7 |
| Jel, initial, lbs./100 sq. ft. | 6 |
| Jell, 10 minute, lbs./100 sq. ft. | 6 | was used as a test mud. Six grams of each sodium sulfonated asphalt per calcium petroleum sulfonate blend (including a blend containing only sodium sulfonated asphalt) were mixed in a 350 milliliter (428 grams) sample of the mud. The mixing was continued on a malt mixer for 90 minutes. At the end of the period, the muds were poured into 1000 milliliter graduates and the volumes of total mud (including foam) were read from time to time. The results are as shown in Table I.

TABLE I

| Blend (Weight Percent Calcium Petroleum Sulfonate) | Volume, Minutes | | | |
|---|---|---|---|---|
| | 0 | 20 | 30 | 60 |
| 0 | 660 | 655 | 650 | 640 |
| 10 | 470 | 465 | 465 | 455 |
| 15 | 455 | 390 | 375 | 365 |
| 20 | 440 | 435 | 430 | 425 |
| 25 | 480 | 380 | 375 | 370 |

Upon comparison of the results, it is apparent that whereas substantial foaming occurred when no calcium petroleum sulfonate was employed, foaming was substantially reduced in those drilling fluids containing the calcium petroleum sulfonate.

As will be evident to those skilled in the art, various modifications of this invention can be made, or followed, in the length of the foregoing disclosure and discussion without departing from the spirit or scope thereof.

I claim:

1. A composition consisting essentially of a drilling fluid selected from the group consisting of oil, water, and emulsions of oil and water, said fluid containing a constituent in an amount sufficient to reduce the filtration rate of said drilling fluid selected from the group consisting of sulfonated asphalts and hydroxylated asphalts, and said fluid further containing a metal petroleum sulfonate prepared from a refined petroleum oil having a viscosity in the range of 140–700 SUS at 210° F., the concentration of said metal petroleum sulfonate in the range of 1–30 weight percent of the combination of said constituent and said metal petroleum sulfonate.

2. The composition of claim 1 wherein said constituent consists of a material selected from the group consisting of ammonium and alkali metal sulfonated asphalt.

3. An aqueous base drilling fluid consisting essentially of water, a constituent selected from the group consisting of sulfonated asphalts and hydroxylated asphalts in an amount sufficient to reduce the filtration rate of said drilling fluid, and a metal petroleum sulfonate prepared from a refined petroleum oil having a viscosity in the range of 140–700 SUS at 210° F., the concentration of said metal petroleum sulfonate in the range of 1–30 weight percent of the combination of said constituent and said metal petroleum sulfonate.

4. An oil-in-water emulsion drilling fluid consisting essentially of water, oil, a constituent selected from the group consisting of sulfonated asphalts and hydroxylated asphalts in an amount sufficient to reduce the filtration rate of said drilling fluid, and a metal petroleum sulfonate prepared from a refined petroleum oil having a viscosity in the range of 140–700 SUS at 210° F., the concentration of said metal petroleum sulfonate in the range of 1–30 weight percent of the combination of said constituent and said metal petroleum sulfonate.

5. A water-in-oil emulsion drilling fluid consisting essentially of oil, water, and a constituent selected from the group consisting of sulfonated asphalts and hydroxylated asphalts in an amount sufficient to reduce the filtration rate of said drilling fluid, and a metal petroleum sulfonate prepared from a refined petroleum oil having a viscosity in the range of 140–700 SUS at 210° F., the concentration of said metal petroleum sulfonate in the range of 1–30 weight percent of the combination of said constituent and said metal petroleum sulfonate.

6. An oil-containing drilling fluid consisting essentially of oil, a constituent selected from the group consisting of sulfonated asphalts and hydroxylated asphalts in an amount sufficient to reduce the filtration rate of said drilling fluid, and a metal petroleum sulfonate prepared from a refined petroleum oil having a viscosity in the range of 140–700 SUS at 210° F., the concentration of said metal petroleum sulfonate in the range of 1–30 weight percent of the combination of said constituent and said metal petroleum sulfonate.

7. A composition consisting essentially of a drilling fluid selected from the group consisting of oil, water, and emulsions of oil and water, said fluid containing a constituent in an amount sufficient to reduce the filtration rate of said drilling fluid selected from the group consisting of sulfonated asphalt and hydroxylated asphalt, and said fluid further containing a metal petroleum sulfonate prepared from a refined petroleum oil having a viscosity in the range of 140–700 SUS at 210° F., the concentration of said metal petroleum sulfonate in the range of 5–15 weight percent of the combination of said constituent and said metal petroleum sulfonate.

8. In a process of drilling a well with well drilling tools, the step of circulating in said well a drilling fluid consisting essentially of a fluid selected from the group consisting of oil, water, and water and oil emulsions, said fluid containing a constituent selected from the group consisting of sulfonated asphalts and hydroxylated asphalts in an amount sufficient to reduce the filtration rate of said drilling fluid, and a metal petroleum sulfonate prepared from a refined petroleum oil having a viscosity of 140–700 SUS at 210° F. with the concentration of said metal petroleum sulfonate in the range of 1–30 weight percent of the combination of said constituent and said metal petroleum sulfonate.

References Cited by the Examiner

UNITED STATES PATENTS

| | | | |
|---|---|---|---|
| 2,400,376 | 5/1946 | Showalter | 252—321 |
| 2,426,088 | 8/1947 | Filbert | 252—321 |
| 2,848,415 | 8/1958 | Logan | 252—33 |
| 2,884,445 | 4/1959 | Axe | 252—33 |
| 3,006,846 | 10/1961 | Stratton. | |
| 3,028,333 | 4/1962 | Stratton et al. | |
| 3,050,464 | 8/1962 | Brown et al. | 252—33 |
| 3,099,624 | 7/1963 | Wilson. | |
| 3,105,046 | 9/1963 | Fischer. | |

FOREIGN PATENTS 803,544   10/1958   Great Britain.

ALBERT T. MEYERS, *Primary Examiner.*

JULIUS GREENWALD, *Examiner.*

H. B. GUYNN, *Assistant Examiner.*